March 13, 1956  V. L. LEECH  2,738,147
MEANS FOR TURNING AND BRAKING JET PROPELLED AIRCRAFT
Filed April 4, 1952  2 Sheets-Sheet 2
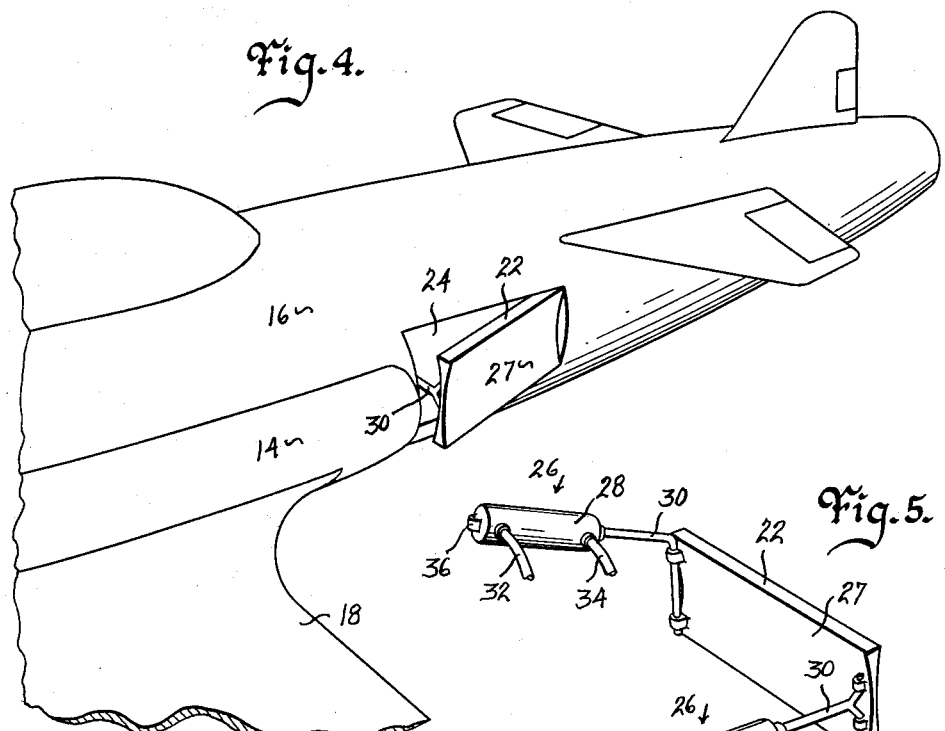
Fig. 4.
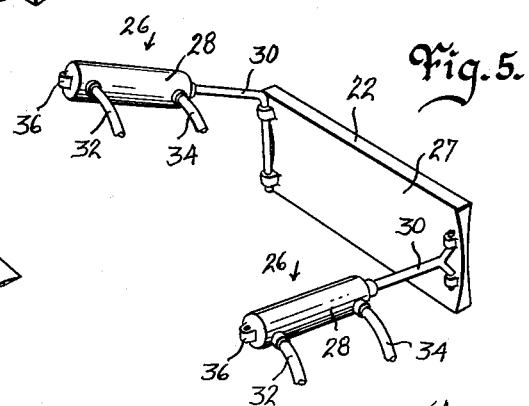
Fig. 5.
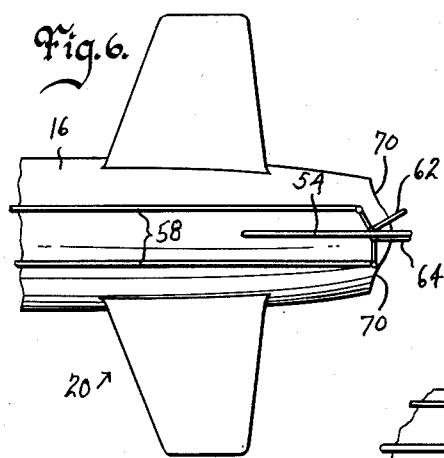
Fig. 6.
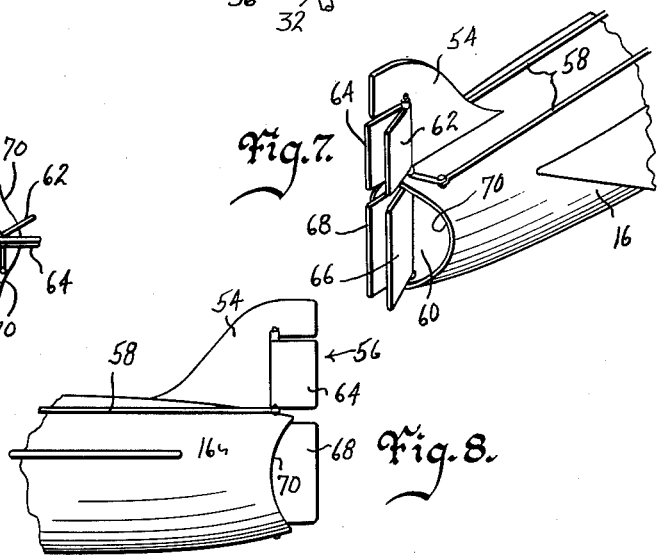
Fig. 7.
Fig. 8.
Inventor
Verne L. Leech
by Talbert Dick & Adler
Attorneys
Witness
Edward P. Seeley

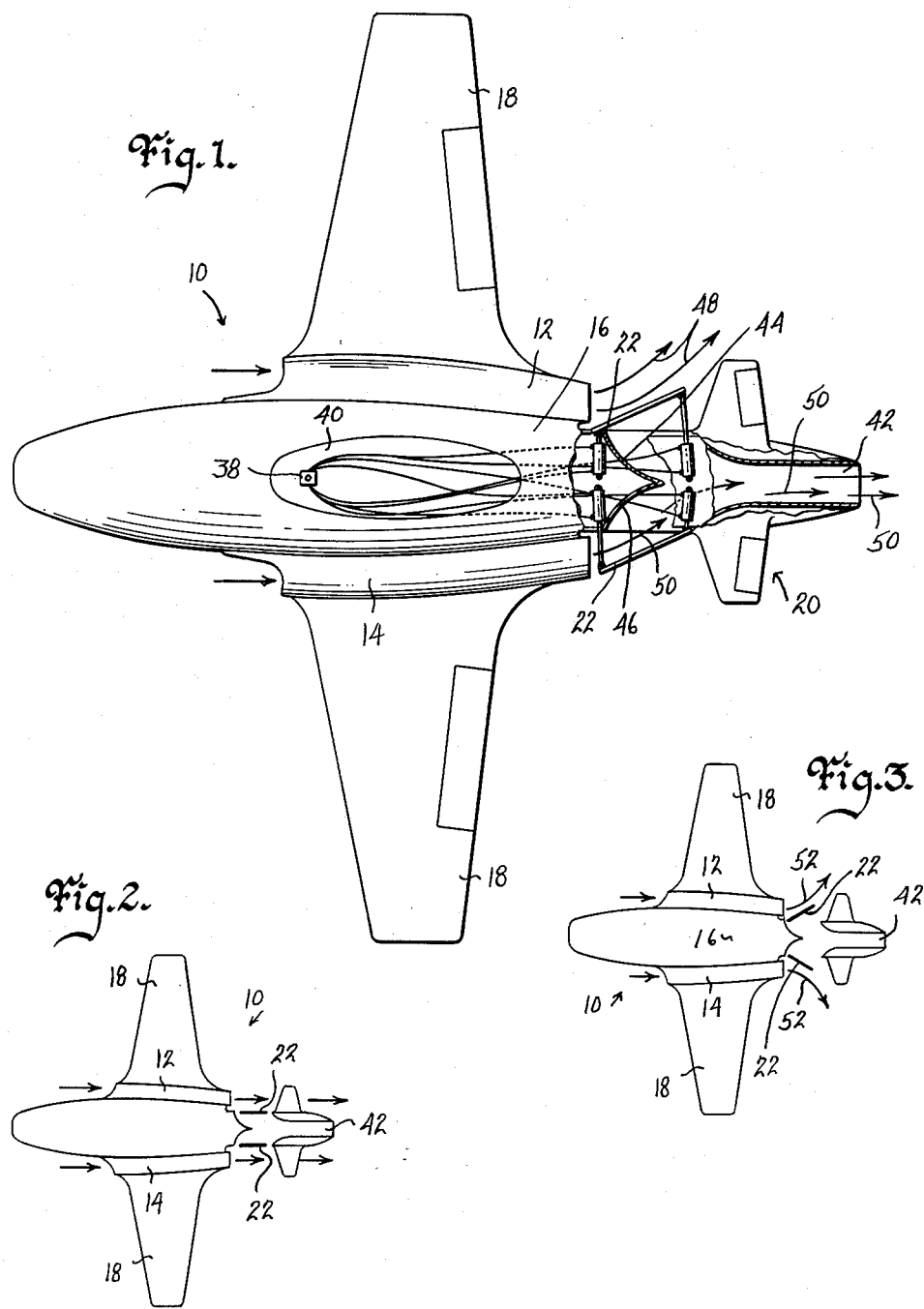

United States Patent Office 2,738,147
Patented Mar. 13, 1956

2,738,147

MEANS FOR TURNING AND BRAKING JET PROPELLED AIRCRAFT

Verne L. Leech, Minneapolis, Minn.

Application April 4, 1952, Serial No. 280,590

4 Claims. (Cl. 244—52)

My invention relates to the art of turning and braking jet propelled aircraft while in motion and particularly while in flight.

Since the advent of the jet propelled aeroplane it would appear that the chief efforts in the engineering and design thereof have been directed toward the devlopment of the jet engine and that little attention, if any, has been given to coordinating the turning of the plane with this new propelling force. It will be observed that the use of a tail assembly with a rudder movable against the airstream in the same manner as for planes of the propeller type has been adapted for turning the new type jet aircraft and while this mechanism will operate for its intended purpose, the tremendous increase in speed by the jets has created problems in turning that call for changes to better suit the needs and demands of this new craft.

Relatively sharp turns at high speeds of which the jet is capable are not feasible with the conventional tail and rudder type steering due to the tremendous pressure of the airstream on the tail. Consequently wide turns at high speeds are dictated by the present structure and while normally a wide turn would not appear objectional, it has serious drawbacks when the jet aircraft is used in combat operations. Under combat conditions it may be necessary for a jet plane in an attach to make more than one pass at a moving target, such as a large enemy bomber or the like and if this is to be accomplished before the target plane can successfully elude its attacker, a relatively sharp turn must be negotiated by the attacking plane for the purpose of saving as much time as possible. A wide turn at high speeds will obviously carry the attacking plane many miles and require considerable time before it is in position for a second attack on a moving target and it has frequently happened that in this time interval the target plane has been successful in eluding its attacker.

Therefore, with this problem in mind, it is the general aim of my invention to provide on a jet propelled aircraft a means for utilizing the jet blast stream in the turning of the plane.

More particularly, it is an object of this invention to provide as a preferred embodiment thereof a deflector plate adapted to change the direction of the jet blast from parallel to the longitudinal axis to the plane to an angle thereto.

Still another object of this invention is to provide on a jet propelled aeroplane having at least two engines and two blast tubes or exhaust ports, means for directing the respective blasts at an angle to the longitudinal axis of the plane whereby the jet force is utilized as a braking medium.

A still further object of this invention is to provide a means for adapting the principle thereof for use in coordination with a conventional type rudder steering mechanism on jet propelled aircraft. In this connection I propose to use a rudder means, smaller than usual, that is adapted particularly for use in emergencies when the jet power might fail, and which is operatively connected to means for changing the direction of the jet blast and is operated by the same controls and in the same manner as the rudder.

These and other objects will be apparent to those skilled in the art.

My invention consists in the construction, arrangement, and combination of the various parts of the device, whereby the objects contemplated are attained as hereinafter more fully set forth, and specifically pointed out in my claims, and illustrated in the accompanying drawings, in which:

Fig. 1 is an elevational view of a double engine jet propelled aeroplane with a portion of the fuselage cut away to more fully illustrate my new turning means therefor, Fig. 2 is a schematic view of a jet plane illustrating the position of my control plates in straight flight, Fig. 3 is a schematic view of a jet plane illustrating the position of the control plates for braking action against forward motion, Fig. 4 is a fragmentary perspective view of the fuselage of a jet plane showing one of the control plates opened in the path of the jet blast for changing the direction thereof, Fig. 5 is an enlarged perspective view of one of the control plates showing hydraulic jacks connected thereto, Fig. 6 is a top view of the tail section of a plane showing a rudder and controls therefor, Fig. 7 is a perspective view of the tail section of a single engine plane having a rudder and controls therefor and showing control plates movable in the jet airstream and connected to the rudder controls, and Fig. 8 is a side view of the tail portion shown in Fig. 6.

Referring to the drawings, I have used the numeral 10 generally to designate an aeroplane operated by principles of jet propulsion. No invention is claimed in the design or shape of such a plane and the drawings shown are merely illustrative of the type of aircraft on which I use my invention. In Fig. 1 a double engine plane is shown as indicated by the tubes or conduits 12 and 14 and I shall first describe the use of my turning controls with respect to this type of craft. The rear or outlet end of the tubes 12 and 14 extend adjacent the fuselage 16 to a point to the rear of the trailing edge of the wing 18 but forward of the tail assembly 20 so that in straight flight the jet blast is indicated by the rear arrows in Fig. 2. To change the direction of the jet blast, I provide an elongated control or deflector plate 22 as a closure for an opening 24 in each respective side of the fuselage 16 intermediate the trailing edge of the wing 18 and forward edge of the tail assembly 20. When in closed position, these plates are flush with the outer side of the fuselage so as to be in effect a part thereof. Each plate 22 is adapted to open outwardly from the front and from the rear respectively and while this may be obviously accomplished in a variety of ways I have illustrated the use of two-way hydraulic jacks 26 as a preferred embodiment for my invention. It will also be observed that the outer and inner side of each plate 22 is concave in construction as at 27 as illustrated in Figs. 4 and 5 with the curvature extending throughout the length of each plate and transversely of its longitudinal axis. As shown in Fig. 5 the jacks 26 are of a well known type comprising the cylinder 28, piston rod 30, and hoses 32 and 34. Each plate has the rod 30 of one jack pivotally secured to its forward inner side and the rod 30 and another jack similarly secured to its rearward inner side. An apertured ear member 36 is secured to one end of each cylinder 28 so that each jack can be pivotally secured thereby in any suitable manner within the fuselage 16. Each of the hoses 32 and 34 connect with a source of hydraulic pressure in the plane so that pressure applied to hoses 32 will extend the rods 30 and pressure to hoses 34 will retract the rods. All hoses 32 and 34 are operatively connected to a central control box 38 operable by the pilot in the cockpit 40. An airflow channel or conduit 42 is provided in the rearward portion of the fuselage and communicates with the outside atmosphere at the tail end thereof. The forward portion of this channel has the diverging channel portions 44 and 46 that communicate respectively with the openings 24 in the fuselage when the plates 22 are in open position as will be later described.

Thus constructed and arranged, my invention will operate in the following manner. For straight flight the plates 22 are closed or flush with the fuselage as shown in Fig. 2 and the jet blasts from the tubes 12 and 14 flow rearwardly past the tail on the respective outer sides of the fuselage. For turning to the right, for example, as illustrated in Fig. 1 the rear portion of the right plate 22 is extended outwardly into the path of the jet blast from tube 12 so that the direction of the blast flow is changed as indicated by the arrows 48. At the same time the forward end of the left plate 22 is extended to a point at the outer side of the blast stream from tube 14 so that this blast stream is diverted into channel portion 46 and flows outwardly to the rear through the main channel 42 as indicated by the arrows 50. For a left turn, the above relationships of the respective plates 22 are reversed. Thus, it will be apparent that the jet force is utilized in the turning maneuver as well as for sustaining flight. For the operation of the jacks 26 as described it will be observed that the forward cylinders are on the inner side of the channel walls in the channel portions 44 and 46 and thus not subjected to direct heat from the jet blast. Likewise the rear jacks due to the L-shaped rods 30 as shown in Fig. 5 may be either above or below the channel 42 for the same purpose.

In Fig. 3 I have shown the rearward end of both plates extended outwardly so that the respective jet blasts are directed as indicated by the arrows 52 and in this position the jet blast force is adapted as a braking means. It will also be apparent that my method of changing the direction of the jet blast may be utilized in ascending or descending without departing from the principle disclosed.

Referring now to Figs. 6, 7 and 8 I have disclosed a modified adaptation of my invention, designed for use on single engine jet aircraft, that is constructed to operate in coordination with a conventional type rudder steering mechanism and by the same controls. The tail 54 and rudder 56 operated from the cockpit by the control means 58 is illustrative of a common form of rudder mechanism and no invention is claimed for these elements as such, nor for the jet blast outlet port 60 at the tail end of the fuselage 16. In adapting the rudder mechanism for use with my invention I construct the rudder in two like independent members 62 and 64 that are each suitably connected to the controls 54 so that in turning only one member 62 and 64 is used as illustrated in Fig. 6. Below the rudders 62 and 64 and swingably mounted in the tail opening 60 within the blast stream are a pair of like baffle or deflector plates 66 and 68. The plate 66 is operatively connected to rudder 62 and coordinated therewith so that movement of the rudder 62 by controls 58 will move the plate 62 within the tail opening 60 to the same corresponding position as the rudder 62 in the airflow stream. Likewise, plate 68 is similarly associated with rudder 64. Thus arranged the plates or baffles 66 and 68 are in effect rudder means within the jet air blast channel. To accommodate the lateral swing of the plates 66 and 68 the opening 60 is widened by extending it slightly forward at the sides as indicated at 70 in Figs. 6, 7 and 8.

Preferably in the disclosure shown in Figs. 6, 7 and 8 I construct the tail and rudder relatively smaller than that required when such rudder means is the sole turning means. My purpose in doing this is to retain the conventional rudder mechanism for use in emergencies such as a flame out when no jet force would be available for guiding the plane. It will be apparent that the movement of the respective plates 66 and 68 will change the direction of the jet blast according to the principle of my invention and thus utilize the jet force for turning. This is done by the same controls and in the same manner as the rudder control with the added feature that the simultaneous movement of the plates 66 and 68 away from each other adapts the jet forces to a brake means. It is pointed out that the widening of the opening 60 as indicated at 70 also serves to allow the jet blast an outlet means in a direction away from the longitudinal axis of the plane when the plates 66 and 68 are moved.

It will also be appreciated that for purposes only of changing the direction of the blast air stream a single rudder and single baffle would suffice, but preferably I have shown the double construction by which a braking action can also be achieved.

Some changes may be made in the construction and arrangement of my method of and means for turning and braking jet propelled aircraft without departing from the real spirit and purpose of my invention, and it is my intention to cover by my claims, any modified forms of structure or use of mechanical equivalents which may be reasonably included within their scope.

I claim:

1. In combination with a jet aeroplane having a fuselage, a wing, a tail assembly, and a jet tube at each side of the fuselage whereby a jet blast flows therefrom rearwardly and longitudinally of the aeroplane on the respective sides of the fuselage, a means for using the jet force in turning the aeroplane, comprising, a deflector plate hingedly mounted in each side of the fuselage, and means for moving each respective plate into the path of flow of the jet blast to change the direction thereof.

2. In combination with a jet aeroplane having a fuselage, a wing, a tail assembly, and a jet tube at each side of the fuselage whereby a jet blast flows therefrom rearwardly and longitudinally of the aeroplane on the respective sides of the fuselage, a means for using the jet force in turning the aeroplane, comprising, an opening on each side of the fuselage intermediate the rear end of the jet tubes and the tail assembly, an air channel in the rear portion of the fuselage and communicating with the outside at the rear, the forward portion of said air channel having diverging branches, each of which communicates with one of the openings in the fuselage, a plate member arranged as a closure in each of said openings, said plate members each pivotally secured at their forward and rearward end portion, means for extending said plates outwardly from the rear at times and outwardly from the front at times, whereby in using the jet force in turning the aeroplane one of the plate members is extended outwardly from the rear into the jet blast so that the same is deflected away from the fuselage and at the same time the other plate member is extended outwardly from the front into the other jet stream to deflect the same into and through said air channel.

3. In combination with a jet aeroplane having a fuselage, and a jet tube at each side of the fuselage whereby a jet blast flows therefrom rearwardly and longitudinally of the aeroplane on the respective sides of the fuselage, a deflector plate hingedly mounted in each side of the fuselage, means for moving each respective plate into the path of flow of the jet blast to change the direction thereof, and control means in said fuselage operatively connected to said first mentioned means to simultaneously move said deflector plates in opposite directions into the path of flow of the respective jet blasts whereby the flow of each blast is changed in the same direction.

4. In combination with a jet aeroplane having a fuselage, and a jet tube at each side of the fuselage whereby a jet blast flows therefrom rearwardly and longitudinally of the aeroplane on the respective sides of the fuselage, a means for using the jet force as a braking medium, comprising, a plate member arranged in each respective side of said fuselage adjacent the path of flow of said jet blast, said plate members each pivotally secured to the fuselage at their forward end portion, and means for extending said plates outwardly from the rear.

References Cited in the file of this patent

UNITED STATES PATENTS

| | | |
|---|---|---|
| 1,572,812 | Rees | Feb. 9, 1926 |
| 1,879,187 | Goddard | Sept. 27, 1932 |
| 2,395,809 | Goddard | Mar. 5, 1946 |
| 2,568,813 | Lundberg | Sept. 25, 1951 |

FOREIGN PATENTS

| | | |
|---|---|---|
| 567,072 | Great Britain | Jan. 26, 1945 |
| 928,469 | France | June 2, 1947 |